United States Patent
LeBlanc et al.

(10) Patent No.: US 8,879,432 B2
(45) Date of Patent: *Nov. 4, 2014

(54) SPLITTER AND COMBINER FOR MULTIPLE DATA RATE COMMUNICATION SYSTEM

(75) Inventors: Wilf LeBlanc, Vancouver (CA); Phil Houghton, Surrey (CA); Kenneth Cheung, Vancouver (CA)

(73) Assignee: Broadcom Corporation, Irvine, CA (US)

( * ) Notice: Subject to any disclaimer, the term of this patent is extended or adjusted under 35 U.S.C. 154(b) by 2269 days.

This patent is subject to a terminal disclaimer.

(21) Appl. No.: 10/313,697

(22) Filed: Dec. 6, 2002

(65) Prior Publication Data
US 2004/0088742 A1    May 6, 2004

Related U.S. Application Data

(60) Provisional application No. 60/414,491, filed on Sep. 27, 2002.

(51) Int. Cl.
| | | |
|---|---|---|
| *H04L 5/14* | (2006.01) | |
| *H04B 1/44* | (2006.01) | |
| *H04B 3/20* | (2006.01) | |
| *H04M 11/06* | (2006.01) | |

(52) U.S. Cl.
CPC .......... *H04M 11/062* (2013.01); *H04M 11/066* (2013.01)
USPC ............................ 370/276; 370/282; 370/285

(58) Field of Classification Search
USPC .......... 370/276, 282–285, 535–538; 375/222; 704/219, 220, 222, 223; 348/427, 429, 348/432
See application file for complete search history.

(56) References Cited

U.S. PATENT DOCUMENTS

| | | | | |
|---|---|---|---|---|
| 2,651,673 | A * | 9/1953 | Fredendall | 348/492 |
| 4,890,316 | A | 12/1989 | Walsh et al. | |
| 5,068,899 | A * | 11/1991 | Ellis et al. | 704/212 |
| 5,619,564 | A * | 4/1997 | Canniff et al. | 379/386 |
| 5,801,695 | A * | 9/1998 | Townshend | 375/340 |
| 5,889,856 | A * | 3/1999 | O'Toole et al. | 379/399.02 |
| 5,914,752 | A * | 6/1999 | Iwamura et al. | 348/427.1 |
| 6,298,055 | B1 * | 10/2001 | Wildfeuer | 370/352 |

(Continued)

FOREIGN PATENT DOCUMENTS

EP    1111589 A    6/2001

OTHER PUBLICATIONS

Itu, Transmission Performance Charactristic of Pulse Code Modulation, Recommendation G.712, Sep. 1992, pp. 2-28.*

*Primary Examiner* — Mark Rinehart
*Assistant Examiner* — Angel Brockman
(74) *Attorney, Agent, or Firm* — Oblon, Spivak, McClelland, Maier & Neustadt, L.L.P.

(57) ABSTRACT

Complementary band-splitter and band-combiner devices and methods of operation of both are disclosed. Embodiments of the invention may allow wideband and narrowband functions and services to operate seamlessly by band-splitting wideband data into low-band data and high-band data. Narrowband data may include only low-band data. Wideband services may operate on both low-band and high-band data, while narrowband services may operate only on low-band data. Another embodiment may include computer-readable storage having stored thereon a computer program having a plurality of code sections executable by a processor for causing the processor to perform the foregoing.

53 Claims, 6 Drawing Sheets

(56) References Cited

U.S. PATENT DOCUMENTS

| | | | |
|---|---|---|---|
| 6,732,070 B1 * | 5/2004 | Rotola-Pukkila et al. | 704/219 |
| 6,735,221 B1 * | 5/2004 | Cherubini | 370/485 |
| 6,856,653 B1 * | 2/2005 | Taniguchi et al. | 379/406.01 |
| 7,035,282 B1 * | 4/2006 | Jagadeesan et al. | 370/465 |
| 7,477,682 B2 * | 1/2009 | LeBlanc | 375/222 |
| 2002/0097807 A1 * | 7/2002 | Gerrits | 375/261 |
| 2003/0093278 A1 * | 5/2003 | Malah | 704/265 |
| 2009/0046593 A1 * | 2/2009 | Ptasinski et al. | 370/252 |

* cited by examiner

SPLITTER AND COMBINER FOR MULTIPLE DATA RATE COMMUNICATION SYSTEM

CROSS-REFERENCE TO RELATED APPLICATIONS/INCORPORATION BY REFERENCE

The applicants claim priority based on provisional application No. 60/414,491, "Splitter and Combiner for Multiple Data Rate Communication System", filed Sep. 27, 2002, the complete subject matter of which is incorporated herein by reference in its entirety.

This application is also related to the following co-pending applications, each of which are herein incorporated by reference:

| Ser. No. | Docket No. | Title | Filed | Inventors |
| --- | --- | --- | --- | --- |
| 60/414,059 | 14057US01 | Multiple Data Rate Communication System | Sep. 27, 2002 | LeBlanc Houghton Cheung |
| 60/414,460 | 14061US01 | Dual Rate Single Band Communication System | Sep. 27, 2002 | LeBlanc Houghton Cheung |
| 60/414,493 | 14064US01 | Switchboard for Multiple Data Rate Communication System | Sep. 27, 2002 | LeBlanc Houghton Cheung |
| 60/414,492 | 14062US01 | Method and System for an Adaptive Multimode Media Queue | Sep. 27, 2002 | LeBlanc Houghton Cheung |

FEDERALLY SPONSORED RESEARCH OR DEVELOPMENT

[Not Applicable]

[MICROFICHE/COPYRIGHT REFERENCE]

[Not Applicable]

BACKGROUND OF THE INVENTION

Traditional voice telephony products are band-limited to 4 kHz bandwidth with 8 kHz sampling. These products include the telephone, data modems, and fax machines. Newer products aiming to achieve higher voice quality have doubled the sampling rate to 16 kHz to encompass a larger 8 kHz bandwidth, which is also known as "wideband" capable. The software implications of doubling the sampling rate are significant. Doubling the sampling rate not only requires doubling the processing cycles, but nearly doubling the memory used to store the data. In addition, software supporting wideband capabilities must not preclude support for legacy 4 kHz band-limited functionality.

Doubling memory and processor cycles requirements is expensive because the memory and processing power footprints of digital signal processors (DSPs) are generally small. Implementing wideband support thus requires creativeness to optimize both memory and cycles.

Additionally, much of the software providing various functions and services, such as echo cancellation, dual-tone multi-frequency (DTMF) detection and generation, and call discrimination (between voice and facsimile transmission, for example), are written for only narrowband signals. Either new software must be written for wideband signals, or the wideband signal must be down-sampled. Where the software is modified, the software should also be capable of integration with preexisting narrowband devices. Providing software for operation with both narrowband and wideband devices is complex and costly.

Accordingly, there is a need for splitting functionality for splitting a wideband data stream into a low-band data stream and a high-band data stream, as well as combining functionality for combining a low-band data stream with a high-band data stream to produce a wideband data stream.

Further limitations and disadvantages of conventional and traditional approaches will become apparent to one of skill in the art, through comparison of such systems with aspects of the present invention as set forth in the remainder of the present application with reference to the drawings.

BRIEF SUMMARY OF THE INVENTION

Seamless wideband support is afforded by utilizing band-split data streams. In an illustrative embodiment of the present invention, the 8 kHz bandwidth is divided into a low band, with approximately 0-4 kHz bandwidth, and a high band, with approximately 4-8 kHz bandwidth. Narrowband functions and services operate on the low band, while wideband functions and services operate on both low and high bands. Splitting functionality splits a wideband data stream into a low band and a high band. Combining functionality combines a low-band data stream with a high-band data stream to produce a wideband data stream.

An aspect of the present invention may be seen in a band splitter comprising at least one filter for modifying wideband data, producing low-band data, a delay element for delaying the wideband data; and a device for removing the low-band data from the delayed wideband data, producing high-band data. The wideband data may represent spectral components from a predetermined lower frequency to a predetermined upper frequency, where the predetermined lower frequency may be approximately 0 Hz and the predetermined upper frequency may be approximately 8 kHz. The low-band data may represent spectral components less than a predetermined frequency, and the high-band data may represent spectral components greater than the predetermined frequency, where the predetermined frequency may be approximately 4 kHz. In addition, the spectral mask of the low-band data may meet the spectral mask of G.712. The at least one filter may further comprise a down sampler for reducing the sampling rate of the low-band data.

In another embodiment, the band splitter may comprise a first filter for filtering wideband data, a down-sampler for down-sampling the output of the first filter producing low-band data, an up-sampler for up-sampling the low-band data, a second filter for filtering the up-sampled low-band data, a delay element to delay the wideband data, and a device for removing the output of the second filter from the delayed wideband data, producing high-band data. The wideband data may represent spectral components from a predetermined lower frequency to a predetermined upper frequency, where the predetermined lower frequency may be approximately 0 Hz and the predetermined upper frequency may be approximately 8 kHz. The low-band data may represent spectral components less than a predetermined frequency, and the high-band data may represent spectral components greater than the predetermined frequency, where the predetermined frequency may be approximately 4 kHz. The spectral mask of the low-band data may meet the spectral mask of G.712.

A further embodiment of the present invention can be seen in a band combiner comprising an up-sampler to up-sample low-band data, a filter for filtering the output of the up-sampler, and an adder for combining the output of the filter and high-band data, producing wideband data. The wideband data may represent spectral components from a predetermined lower frequency to a predetermined upper frequency, where the predetermined lower frequency may be approximately 0 Hz. and the predetermined upper frequency may be approximately 8 kHz. The spectral mask of the low-band data may meet the spectral mask of G.712.

Another aspect of the present invention relates to a method of splitting wideband data into low-band data and high-band data, the method comprising filtering the wideband data to produce low-band data, delaying the wideband data, and removing the low-band data from the delayed wideband data to produce high-band data. In such an embodiment, the wideband data may represent spectral components from a predetermined lower frequency to a predetermined upper frequency, where the predetermined lower frequency is approximately 0 Hz, and the predetermined upper frequency may be approximately 8 kHz. The low-band data may represent spectral components less than a predetermined frequency, and the high-band data may represent spectral components greater than the predetermined frequency, where the predetermined frequency may be approximately 4 kHz. In addition, the spectral mask of the low-band data may meet the spectral mask of G.712.

Yet another embodiment in accordance with the present invention is a method of splitting wideband data into low-band data and high-band data, the method comprising filtering the wideband data, down-sampling the filtered wideband data to produce low-band data, up-sampling the low-band data, filtering the up-sampled low-band data, delaying the wideband data, and removing the filtered up-sampled low-band data from the delayed wideband data to produce high-band data. The wideband data in such an embodiment may represent spectral components from a predetermined lower frequency to a predetermined upper frequency, where the predetermined lower frequency is approximately 0 Hz, and the predetermined upper frequency may be approximately 8 kHz. The low-band data may represent spectral components less than a predetermined frequency, and the high-band data may represent spectral components greater than the predetermined frequency, where the predetermined frequency may be approximately 4 kHz. In addition, the spectral mask of the low-band data may meet the spectral mask of G.712

A further embodiment of the present invention relates to a method of combining low-band data and high-band data to produce wideband data, the method comprising up-sampling the low-band data, filtering the up-sampled low-band data, and adding the filtered up-sampled low-band data to the high-band data to produce wideband data. The wideband data may represent spectral components from a predetermined lower frequency to a predetermined upper frequency, where the predetermined lower frequency may be approximately 0 Hz and the predetermined upper frequency may be approximately 8 kHz. The low-band data may represent spectral components less than a predetermined frequency, and the high-band data represents spectral components greater the predetermined frequency, where the predetermined frequency may be approximately 4 kHz. The spectral mask of the low-band data may meet the spectral mask of G.712.

A further embodiment of the present invention may include machine-readable storage, having stored thereon a computer program having a plurality of code sections executable by a machine for causing the machine to perform the foregoing.

These and other advantages, aspects, and novel features of the present invention, as well as details of illustrated embodiments, thereof, will be more fully understood from the following description and drawings.

DETAILED DESCRIPTION OF THE INVENTION

Figure 1:
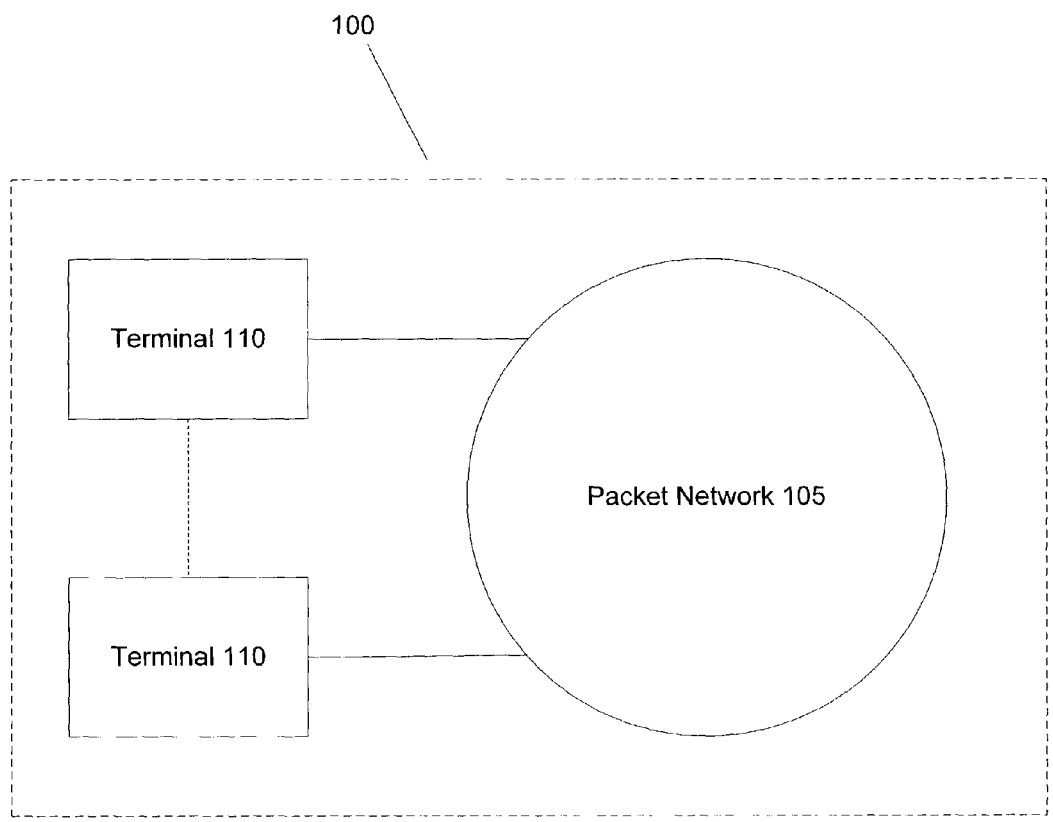
FIG. 1 is a block diagram of an exemplary communication system wherein the present invention can be practiced.

Referring now to FIG. 1, there is illustrated a block diagram of an exemplary voice-over-packet (VoP) network 100 wherein the present invention can be practiced. The VoP network 100 comprises a packet network 105 and a plurality of terminals 110. The terminals 110 are capable of receiving user input. The user input can comprise, for example, the user's voice, video, or a document for facsimile transmission. The VoP network 100 supports various communication sessions between terminals 110 which simulate voice calls and/or facsimile transmissions over a switched telephone network.

The terminals 110 are equipped to convert the user input into an electronic signal, digitize the electronic signal, and packetize the digital samples. The sampling rate for digitizing the electronic signal can be either 8 kHz (narrowband) sampling, or 16 kHz (wideband) sampling. Accordingly, narrowband sampling is bandwidth limited to 4 kHz while wideband sampling is bandwidth limited to 8 kHz.

The VoP network 100 provides various functions and services, including dual-tone multi-frequency (DTMF) generation and detection, and call discrimination between voice and facsimile, by means of a Virtual Hausware Device (VHD) and a Physical Device Driver (PXD). The foregoing services are implemented by software modules and utilize narrowband digitized samples for inputs. For terminals 110 with narrowband sampling, the digitized samples are provided directly to the software modules. For terminals 110 with wideband sampling, the 8 kHz bandwidth is split into a high-band data stream and a G.712 compliant low-band data stream. The software modules requiring narrowband digitized samples operate on the low-band data, while software modules requiring wideband digitized samples operate on both the high-band data and the low-band data.

The low-band data is stored as 8 kHz sampled data, while the high-band data is stored as 16 kHz sampled data. In one embodiment, both bands are not stored symmetrically as 8 kHz sampled data because the 8 kHz bandwidth is not split symmetrically down the center. This design incurs a memory cost in return for voice quality and G.712 compliance. Alternatively, if aliasing may be ignored, the 8 kHz bandwidth may be split symmetrically with both low-band data and high-band data stored as 8 kHz sampled data. This alternative avoids the increased memory requirement, but at the cost of voice quality. Both symmetric and asymmetric split-band architectures are similar in implementation except for the sampling rate of the media streams. In some designs, one may be more desirable. In other designs, the reverse may be true. The optimal choice depends on an acceptable memory versus performance trade-off.

The split-band approach enables straightforward support for narrowband and wideband services because narrowband services are incognizant of the wideband support. Narrowband services operate on the 8 kHz-sampled stream of data (i.e., the low-band data). Generally, only wideband services understand and operate on both bands.

Figure 2:
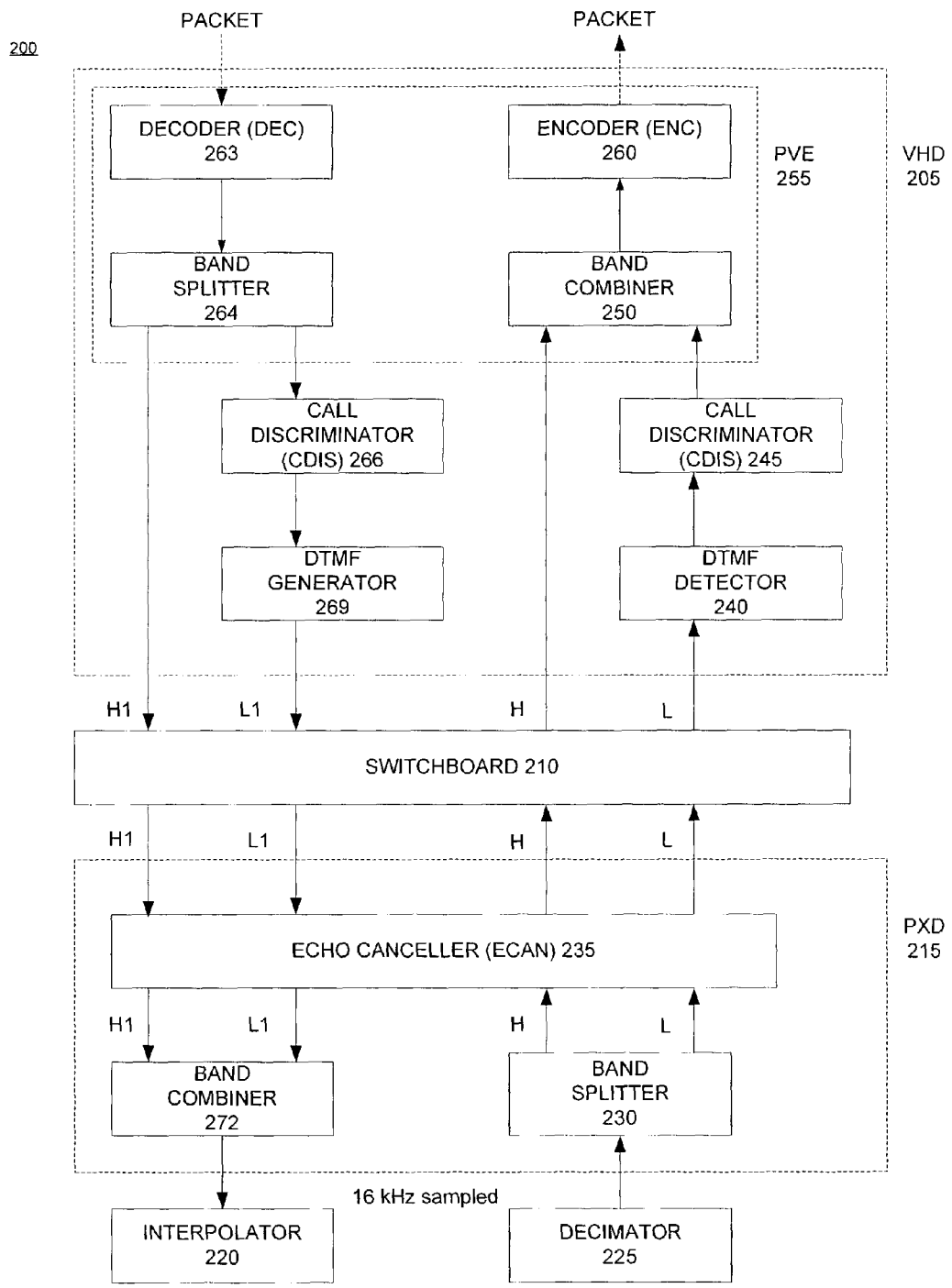
FIG. 2 is a signal flow diagram for a split-band architecture in accordance with an embodiment of the present invention.

Referring now to FIG. 2, there is illustrated a signal flow diagram of a split-band architecture 200 in accordance with an embodiment of the present invention. The split-band architecture 200 includes a Virtual Hausware Driver (VHD) 205, a switchboard 210, a physical device driver (PXD) 215, an interpolator 220, and a decimator 225.

The PXD 215 represents an interface for receiving the input signal from the user and performs various functions, such as echo cancellation. The order of the PXD 215 functions maintains continuity and consistency of the data flow. The top of the PXD 215 is at the switchboard 210 interface. The bottom of the PXD 215 is at the interpolator 220 and decimator 225 interface. For wideband operation, the band splitter/combiner PXD 215 function may be located as follows. On the switchboard 210 side of this PXD 215 function is split-band data. On the other side is single-band data. PXD 215 functions that operate on single-band data, like side-tone or high-pass PXD 215 functions, are ordered below the band splitter/combiner PXD 215 function. Other PXD 215 functions that operate on split-band data are ordered above it.

The VHD 205 is a logical interface to destination terminal 110 via the packet network 105 and performs functions such as dual tone multi-frequency (DTMF) detection and generation, and call discrimination (CDIS). During a communication (voice, video, fax) between terminals, each terminal 110 associates a VHD 205 with each of the terminal(s) 110 with which it is communicating. For example, during a voice-over-packet (VoP) network call between two terminals 110, each terminal 110 associates a VHD 205 with the other terminal 110. The switchboard 210 associates the VHD 205 and the PXD 215 in a manner that will be described below.

A wideband system may contain a mix of narrowband and wideband VHDs 205 and PXDs 215. A difference between narrowband and wideband device drivers is their ingress and egress sample buffer interface. A wideband VHD 205 or PXD 215 has useful data at its high and low-band sample buffer interfaces and can include both narrowband and wideband services and functions. A narrowband VHD 205 or PXD 215 has useful data at its low-band sample buffer interface and no data at its high-band sample buffer interface. The switchboard interfaces with narrowband and wideband VHDs 205 and PXDs 215 through their high and low-band sample buffer interfaces. The switchboard 210 is incognizant of the wideband or narrowband nature of the device drivers. The switchboard 210 reads and writes data through the sample buffer interfaces. The high and low-band sample buffer interfaces may provide data at any arbitrary sampling rate. In an embodiment of the present invention, the low-band sample buffer interface provides data sampled at 8 kHz and the high-band sample buffer interface provides data sampled at 16 kHz. Additionally, a VHD 205 can be dynamically changed between wideband and narrowband and vice versa.

The VHD 205 and PXD 215 driver structures may include sample rate information to identify the sampling rates of the high and low-band data. The information may be part of the interface structure that the switchboard understands and may contain a buffer pointer and an enumeration constant or the number of samples to indicate the sample rate.

The split-band architecture 200 is also characterized by an ingress path and an egress path, wherein the ingress path transmits user inputs to the packet network, and wherein the egress path receives packets from the packet network 105. The ingress path and the egress path can either operate in a wideband support mode, or a narrowband mode. Additionally, although the illustrated ingress path and egress path are both operating in the wideband support mode, the ingress path and the egress path are not required to operate in the same mode. For example, the ingress path can operate in the wideband support mode, while the egress path operates in the narrowband mode. The ingress path comprises the decimator 225, band splitter 230, echo canceller 235, switchboard 210, and services including but not limited to DTMF detector 240, CDIS 245, and packet voice engine (PVE) 255 comprising a combiner 250 and an encoder algorithm 260. The switchboard 210 can comprise the switchboard described in provisional patent application Ser. No. 60/414,493, "Switchboard for Multiple Data Rate Communication System", which is incorporated by reference in its entirety.

In a wideband device, the decimator 225 receives the user inputs and provides 16 kHz sampled data for an 8 kHz band-limited signal. The 16 kHz sampled data is received by the band splitter 230. The band splitter 230 splits the 8 kHz bandwidth into low-band data (L) and high-band data (H). The low-band data, L, and high-band data, H, are transmitted through the echo canceller 235, and switchboard 210 to the VHD 205 associated with the destination terminal 110.

The VHD 205 receives the low-band data, L, and high-band data, H. In some cases, the DTMF detector 240 may be designed for operation on only narrowband digitized samples, and only the low-band data is passed to DTMF detector 240. Similarly, where CDIS 245 is designed for operation on only narrowband digitized samples, only the low-band data is provided to CDIS 245, which distinguishes a voice call from a facsimile transmission. The low-band data, L, and high-band data, H, are combined at a combiner 250 in PVE 255.

The PVE 255 is responsible for issuing media queue mode change commands consistent with the active encoder and decoder. The media queues can comprise, for example, the media queues described in provisional patent application Ser. No. 60/414,492, "Method and System for an Adaptive Multimode Media Queue", which is incorporated herein by reference in its entirety.

The PVE 255 ingress thread receives raw samples. The raw samples include both low and high-band data. However, to save memory only low-band data is forwarded when the VHD 205 is operating in narrowband mode. Both low and high-band data are combined and forwarded when operating in wideband mode.

At PVE 255, encoder 260 packetizes the combined signal for transmission over the packet network 105. The encoder 260 can comprise, for example, the BroadVoice 32 Encoder made by Broadcom, Inc.

The egress path comprises decoder 263, band splitter 264, CDIS 266, DTMF generator 269, switchboard 210, echo canceller 235, band combiner 272, and interpolator 220. The egress queue receives data packets from the packet network 105 at the decoder 263. The decoder 263 can comprise the BroadVoice 32 Decoder made by Broadcom, Inc. The decoder 263 decodes data packets received from the packet network 105 and provides 16 kHz sampled data. The 16 kHz sampled data is provided to band splitter 264 which separates low-band data, L1, from high-band data, H1. Again, in one embodiment, where CDIS 266 and DTMF generator 269 require narrowband digitized samples, only the low-band data is used by CDIS 266 and the DTMF generator 269.

The DTMF generator 269 generates DTMF tones if detected from the sending terminal 110. These tones are written to the low-band data, L1. The low-band data, L1, and high-band data, H1, are received by the switchboard 210. The switchboard 210 provides the low-band data, L1, and high-band data, H1, to the PXD 215. The low-band data, L1, and high-band data, H1, are passed through the echo canceller 235 and provided to the band combiner 272 which combines the low-band data, L1, and high-band data, H1. The combined low-band data, L1, and high-band data, H1, are provided to interpolator 220. The interpolator 220 provides 16 kHz sampled data.

Figure 3:
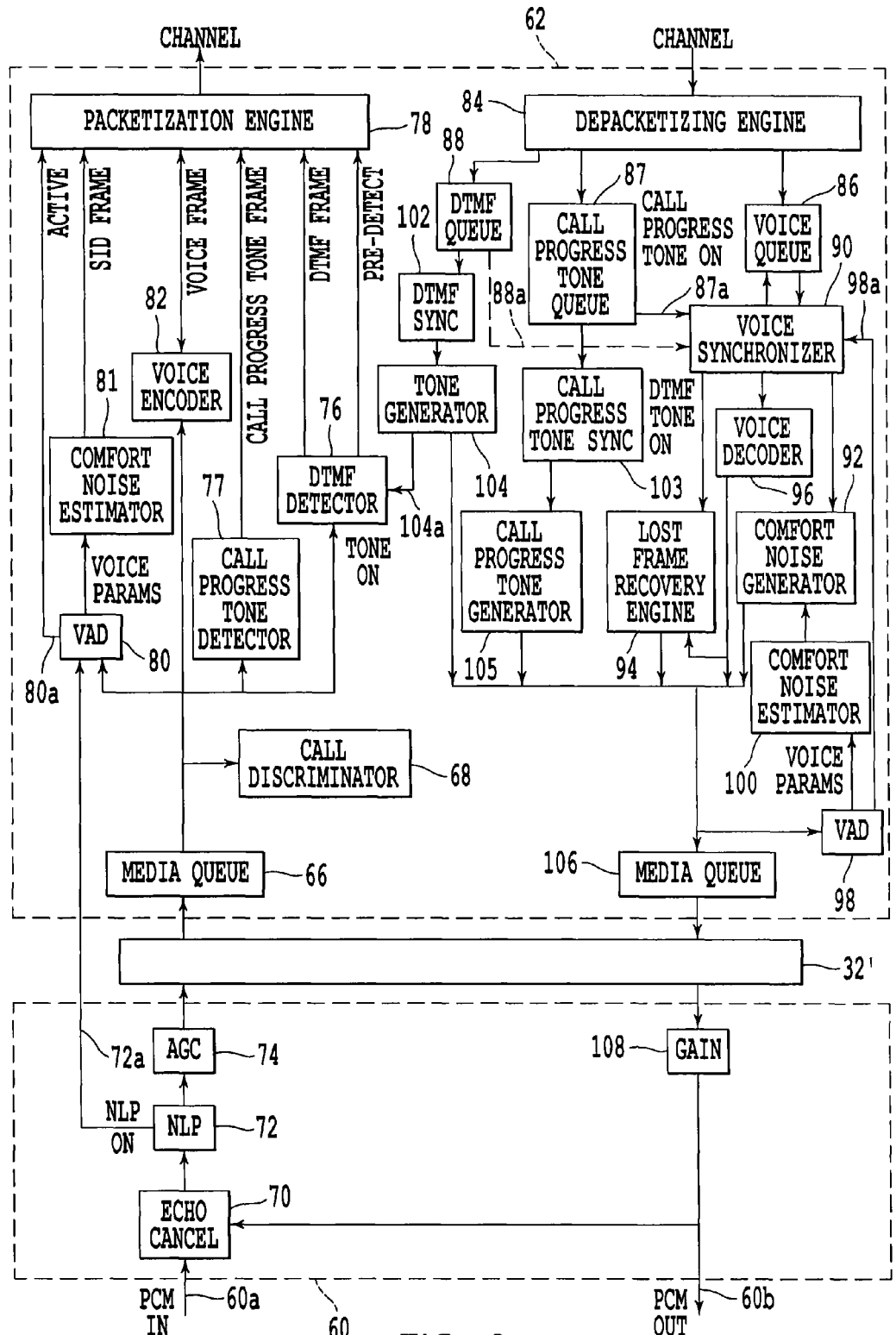
FIG. 3 is a system block diagram of a signal processing system operating in a voice mode in accordance with an illustrative embodiment of the present invention.

The services invoked by the network VHD in the voice mode and the associated PXD are shown schematically in FIG. 3. In the described exemplary embodiment, the PXD 60 provides two-way communication with a telephone or a circuit-switched network, such as a PSTN line (e.g. DSO) carrying a 64 kb/s pulse code modulated (PCM) signal, i.e., digital voice samples.

The incoming PCM signal 60a is initially processed by the PXD 60 to remove far-end echoes that might otherwise be transmitted back to the far-end user. As the name implies, echoes in telephone systems are the return of the talker's voice resulting from the operation of the hybrid with its two-four wire conversion. If there is low end-to-end delay, echo from the far end is equivalent to side-tone (echo from the near-end), and therefore, not a problem. Side-tone gives users feedback as to how loudly they are talking, and indeed, without side-tone, users tend to talk too loudly. However, far-end echo delays of more than about 10 to 30 msec significantly degrade the voice quality and are a major annoyance to the user.

An echo canceller 70 is used to remove echoes from far-end speech present on the incoming PCM signal 60a before routing the incoming PCM signal 60a back to the far-end user. The echo canceller 70 samples an outgoing PCM signal 60b from the far-end user, filters it, and combines it with the incoming PCM signal 60a. Preferably, the echo canceller 70 is followed by a non-linear processor (NLP) 72 which may mute the digital voice samples when far-end speech is detected in the absence of near-end speech. The echo canceller 70 may also inject comfort noise which in the absence of near-end speech may be roughly at the same level as the true background noise or at a fixed level.

After echo cancellation, the power level of the digital voice samples is normalized by an automatic gain control (AGC) 74 to ensure that the conversation is of an acceptable loudness. Alternatively, the AGC can be performed before the echo canceller 70. However, this approach would entail a more complex design because the gain would also have to be applied to the sampled outgoing PCM signal 60b. In the described exemplary embodiment, the AGC 74 is designed to adapt slowly, although it should adapt fairly quickly if overflow or clipping is detected. The AGC adaptation should be held fixed if the NLP 72 is activated.

After AGC, the digital voice samples are placed in the media queue 66 in the network VHD 62 via the switchboard 32'. In the voice mode, the network VHD 62 invokes three services, namely call discrimination, packet voice exchange, and packet tone exchange. The call discriminator 68 analyzes the digital voice samples from the media queue to determine whether a 2100 Hz tone, a 1100 Hz tone or V.21 modulated HDLC flags are present. If either tone or HDLC flags are detected, the voice mode services are terminated and the appropriate service for fax or modem operation is initiated. In the absence of a 2100 Hz tone, a 1100 Hz tone, or HDLC flags, the digital voice samples are coupled to the encoder system which includes a voice encoder 82, a voice activity detector (VAD) 80, a comfort noise estimator 81, a DTMF detector 76, a call progress tone detector 77 and a packetization engine 78.

Typical telephone conversations have as much as sixty percent silence or inactive content. Therefore, high bandwidth gains can be realized if digital voice samples are suppressed during these periods. A VAD 80, operating under the packet voice exchange, is used to accomplish this function. The VAD 80 attempts to detect digital voice samples that do not contain active speech. During periods of inactive speech, the comfort noise estimator 81 couples silence identifier (SID) packets to a packetization engine 78. The SID packets contain voice parameters that allow the reconstruction of the background noise at the far end.

From a system point of view, the VAD 80 may be sensitive to the change in the NLP 72. For example, when the NLP 72 is activated, the VAD 80 may immediately declare that voice is inactive. In that instance, the VAD 80 may have problems tracking the true background noise level. If the echo canceller 70 generates comfort noise during periods of inactive speech, it may have a different spectral characteristic from the true background noise. The VAD 80 may detect a change in noise character when the NLP 72 is activated (or deactivated) and declare the comfort noise as active speech. For these reasons, the VAD 80 should generally be disabled when the NLP 72 is activated. This is accomplished by a "NLP on" message 72a passed from the NLP 72 to the VAD 80.

The voice encoder 82, operating under the packet voice exchange, can be a straight 16-bit PCM encoder or any voice encoder which supports one or more of the standards promulgated by ITU. The encoded digital voice samples are formatted into a voice packet (or packets) by the packetization engine 78. These voice packets are formatted according to an applications protocol and sent to the host (not shown). The voice encoder 82 is invoked only when digital voice samples with speech are detected by the VAD 80. Since the packetization interval may be a multiple of an encoding interval, both the VAD 80 and the packetization engine 78 should cooperate to decide whether or not the voice encoder 82 is invoked. For example, if the packetization interval is 10 msec and the encoder interval is 5 msec (a frame of digital voice samples is 5 ms), then a frame containing active speech should cause the subsequent frame to be placed in the 10 ms packet regardless of the VAD state during that subsequent frame. This interaction can be accomplished by the VAD 80 passing an "active" flag 80a to the packetization engine 78, and the packetization engine 78 controlling whether or not the voice encoder 82 is invoked.

In the described exemplary embodiment, the VAD 80 is applied after the AGC 74. This approach provides optimal flexibility because both the VAD 80 and the voice encoder 82 are integrated into some speech compression schemes such as those promulgated in ITU Recommendations G.729 with Annex B VAD (March 1996)—Coding of Speech at 8 kbits/s Using Conjugate-Structure Algebraic-Code-Exited Linear Prediction (CS-ACELP), and G.723.1 with Annex A VAD (March 1996)—Dual Rate Coder for Multimedia Communications Transmitting at 5.3 and 6.3 kbit/s, the contents of which is hereby incorporated herein by reference as though set forth in full herein.

Operating under the packet tone exchange, a DTMF detector 76 determines whether or not there is a DTMF signal present at the near end. The DTMF detector 76 also provides a pre-detection flag 76a which indicates whether or not it is likely that the digital voice sample might be a portion of a DTMF signal. If so, the pre-detection flag 76a is relayed to the packetization engine 78 instructing it to begin holding voice packets. If the DTMF detector 76 ultimately detects a DTMF signal, the voice packets are discarded, and the DTMF signal is coupled to the packetization engine 78. Otherwise the voice packets are ultimately released from the packetization engine 78 to the host (not shown). The benefit of this method is that there is only a temporary impact on voice packet delay when a DTMF signal is pre-detected in error, and not a constant buffering delay. Whether voice packets are held while the pre-detection flag 76a is active could be adaptively controlled by the user application layer.

Similarly, a call progress tone detector 77 also operates under the packet tone exchange to determine whether a precise signaling tone is present at the near end. Call progress tones are those which indicate what is happening to dialed phone calls. Conditions like busy line, ringing called party, bad number, and others each have distinctive tone frequencies and cadences assigned them. The call progress tone detector 77 monitors the call progress state, and forwards a call progress tone signal to the packetization engine to be packetized and transmitted across the packet based network. The call progress tone detector may also provide information regarding the near end hook status which is relevant to the signal processing tasks. If the hook status is on hook, the VAD should preferably mark all frames as inactive, DTMF detection should be disabled, and SID packets should only be transferred if they are required to keep the connection alive.

The decoding system of the network VHD 62 essentially performs the inverse operation of the encoding system. The decoding system of the network VHD 62 comprises a de-packetizing engine 84, a voice queue 86, a DTMF queue 88, a precision tone queue 87, a voice synchronizer 90, a DTMF synchronizer 102, a precision tone synchronizer 103, a voice decoder 96, a VAD 98, a comfort noise estimator 100, a comfort noise generator 92, a lost packet recovery engine 94, a tone generator 104, and a precision tone generator 105.

The de-packetizing engine 84 identifies the type of packets received from the host (i.e., voice packet, DTMF packet, call progress tone packet, SID packet), transforms them into frames which are protocol independent. The de-packetizing engine 84 then transfers the voice frames (or voice parameters in the case of SID packets) into the voice queue 86, transfers the DTMF frames into the DTMF queue 88 and transfers the call progress tones into the call progress tone queue 87. In this manner, the remaining tasks are, by and large, protocol independent.

A jitter buffer is utilized to compensate for network impairments such as delay jitter caused by packets not arriving with the same relative timing in which they were transmitted. In addition, the jitter buffer compensates for lost packets that occur on occasion when the network is heavily congested. In the described exemplary embodiment, the jitter buffer for voice includes a voice synchronizer 90 that operates in conjunction with a voice queue 86 to provide an isochronous stream of voice frames to the voice decoder 96.

Sequence numbers embedded into the voice packets at the far end can be used to detect lost packets, packets arriving out of order, and short silence periods. The voice synchronizer 90 can analyze the sequence numbers, enabling the comfort noise generator 92 during short silence periods and performing voice frame repeats via the lost packet recovery engine 94 when voice packets are lost. SID packets can also be used as an indicator of silent periods causing the voice synchronizer 90 to enable the comfort noise generator 92. Otherwise, during far-end active speech, the voice synchronizer 90 couples voice frames from the voice queue 86 in an isochronous stream to the voice decoder 96. The voice decoder 96 decodes the voice frames into digital voice samples suitable for transmission on a circuit switched network, such as a 64 kb/s PCM signal for a PSTN line. The output of the voice decoder 96 (or the comfort noise generator 92 or lost packet recovery engine 94 if enabled) is written into a media queue 106 for transmission to the PXD 60.

The comfort noise generator 92 provides background noise to the near-end user during silent periods. If the protocol supports SID packets, (and these are supported for VTOA, FRF-11, and VoIP), the comfort noise estimator at the far-end encoding system should transmit SID packets. Then, the background noise can be reconstructed by the near-end comfort noise generator 92 from the voice parameters in the SID packets buffered in the voice queue 86. However, for some protocols, namely, FRF-11, the SID packets are optional, and other far-end users may not support SID packets at all. In these systems, the voice synchronizer 90 continues to operate properly. In the absence of SID packets, the voice parameters of the background noise at the far end can be determined by running the VAD 98 at the voice decoder 96 in series with a comfort noise estimator 100.

Preferably, the voice synchronizer 90 is not dependent upon sequence numbers embedded in the voice packet. The voice synchronizer 90 can invoke a number of mechanisms to compensate for delay jitter in these systems. For example, the voice synchronizer 90 can assume that the voice queue 86 is in an underflow condition due to excess jitter and perform packet repeats by enabling the lost frame recovery engine 94. Alternatively, the VAD 98 at the voice decoder 96 can be used to estimate whether or not the underflow of the voice queue 86 was due to the onset of a silence period or due to packet loss. In this instance, the spectrum and/or the energy of the digital voice samples can be estimated and the result 98a fed back to the voice synchronizer 90. The voice synchronizer 90 can then invoke the lost packet recovery engine 94 during voice packet losses and the comfort noise generator 92 during silent periods.

When DTMF packets arrive, they are de-packetized by the de-packetizing engine 84. DTMF frames at the output of the de-packetizing engine 84 are written into the DTMF queue 88. The DTMF synchronizer 102 couples the DTMF frames from the DTMF queue 88 to the tone generator 104. Much like the voice synchronizer, the DTMF synchronizer 102 is employed to provide an isochronous stream of DTMF frames to the tone generator 104. Generally speaking, when DTMF packets are being transferred, voice frames should be suppressed. To some extent, this is protocol dependent. However, the capability to flush the voice queue 86 to ensure that the voice frames do not interfere with DTMF generation is desirable. Essentially, old voice frames which may be queued are discarded when DTMF packets arrive. This will ensure that there is a significant gap before DTMF tones are generated. This is achieved by a "tone present" message 88a passed between the DTMF queue and the voice synchronizer 90.

The tone generator 104 converts the DTMF signals into a DTMF tone suitable for a standard digital or analog telephone. The tone generator 104 overwrites the media queue 106 to prevent leakage through the voice path and to ensure that the DTMF tones are not too noisy.

There is also a possibility that DTMF tone may be fed back as an echo into the DTMF detector 76. To prevent false detection, the DTMF detector 76 can be disabled entirely (or disabled only for the digit being generated) during DTMF tone generation. This is achieved by a "tone on" message 104a passed between the tone generator 104 and the DTMF detector 76. Alternatively, the NLP 72 can be activated while generating DTMF tones.

When call progress tone packets arrive, they are de-packetized by the de-packetizing engine 84. Call progress tone frames at the output of the de-packetizing engine 84 are written into the call progress tone queue 87. The call progress tone synchronizer 103 couples the call progress tone frames from the call progress tone queue 87 to a call progress tone generator 105. Much like the DTMF synchronizer, the call progress tone synchronizer 103 is employed to provide an isochronous stream of call progress tone frames to the call progress tone generator 105. And much like the DTMF tone generator, when call progress tone packets are being transferred, voice frames should be suppressed. To some extent, this is protocol dependent. However, the capability to flush the voice queue 86 to ensure that the voice frames do not interfere with call progress tone generation is desirable. Essentially, old voice frames which may be queued are discarded when call progress tone packets arrive to ensure that there is a significant inter-digit gap before call progress tones are generated. This is achieved by a "tone present" message 87a passed between the call progress tone queue 87 and the voice synchronizer 90.

The call progress tone generator 105 converts the call progress tone signals into a call progress tone suitable for a standard digital or analog telephone. The call progress tone generator 105 overwrites the media queue 106 to prevent leakage through the voice path and to ensure that the call progress tones are not too noisy.

The outgoing PCM signal in the media queue 106 is coupled to the PXD 60 via the switchboard 32'. The outgoing PCM signal is coupled to an amplifier 108 before being outputted on the PCM output line 60b.

Referring again to FIG. 2, the low-band data, L and L1, is designed to have sufficient separation from the high-band data, H and H1. This is because narrowband services will, in one embodiment, operate only on the low-band data and not on the high-band data. In an illustrative embodiment of the present invention, the band splitters 230, 264 and band combiners 250, 272 are substantially lossless.

Figure 4:
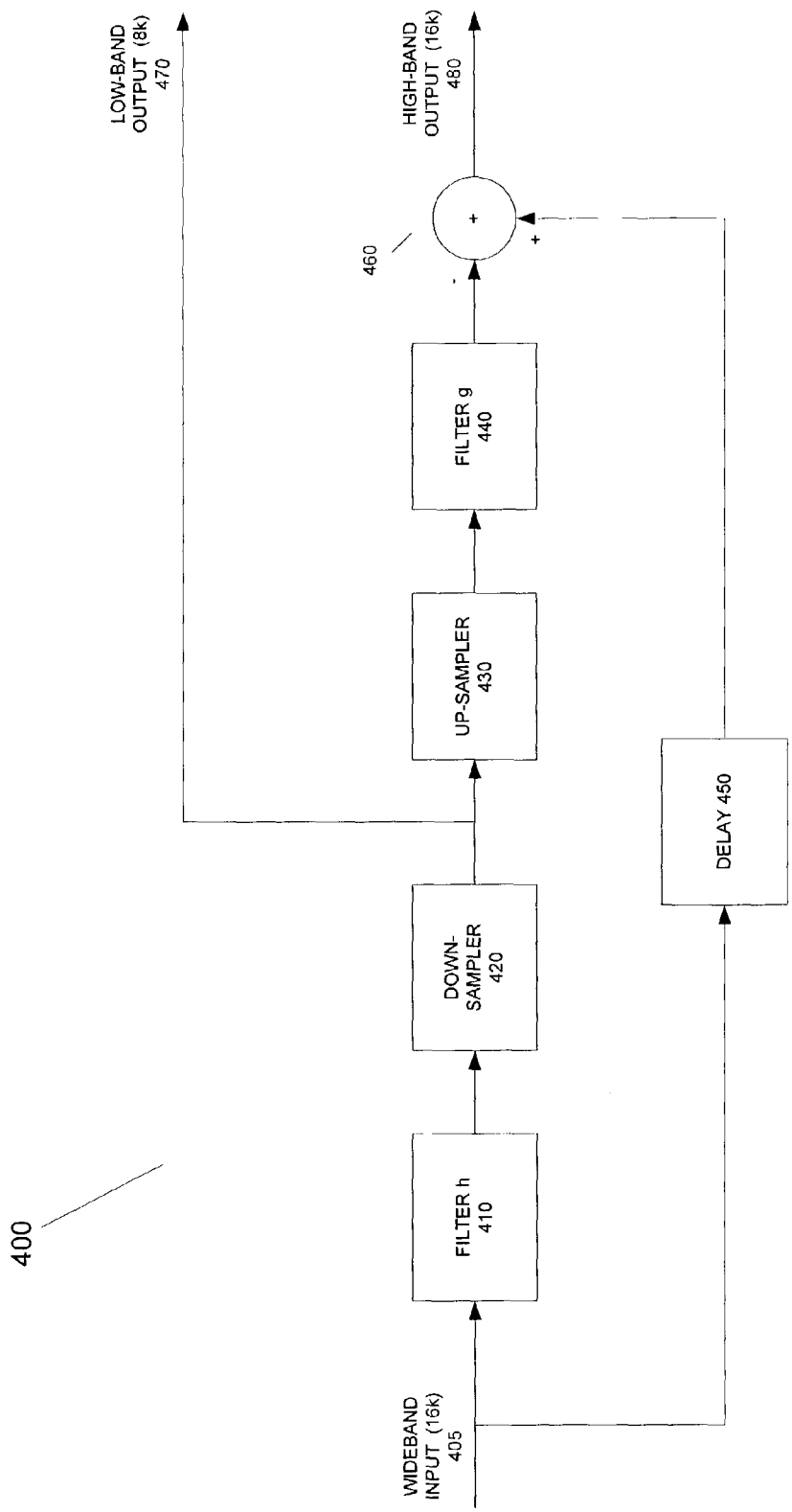
FIG. 4 is a block diagram of a band splitter in accordance with an illustrative embodiment of the present invention.

In the illustrative embodiment shown in FIG. 2, the band splitter 230 and band combiner 272 reside with PXD 225, and band splitter 264 and band combiner 250 reside with PVE 255. This implementation may be preferred because the PXD 225 and PVE 255 understand the band-split data streams and need to operate on both band-split and band-combined data. In an alternative embodiment of the present invention, the band splitter 230 and band combiner 272 may reside external to PXD 225, and band splitter 264 and band combiner 250 reside external to PVE 255. 1681 FIG. 4 is a block diagram of a band splitter 400 such as band splitters 230 and 264 of FIG. 2, according to an illustrative embodiment of the present invention. Band splitter 400 comprises finite impulse response (FIR) filter h 410, down-sampler 420, up-sampler 430, FIR filter g 440, and delay element 450. The wideband data 405 is filtered by FIR filter h 410 and the filter output is then down-sampled by a factor of two by down-sampler 420 to produce the low-band data 470. To obtain the high-band data 480, the low-band data 470 is up-sampled by a factor of two by up-sampler 430, and the up-sampled data is filtered by FIR filter g 440. The wideband data 405 is delayed by delay element 450. The delay, D, of delay element 450 is the filter order. To remove the spectral content of the low-band data from the delayed wideband data, the output of FIR filter g 440 is subtracted from the delayed wideband data to obtain the high-band data 480. The removal of the spectral content of the low-band data from the wideband data can be accomplished as in the embodiment illustrated in FIG. 4, or in another embodiment, for example, by inverting the output of FIR filter g 440 and adding the inverted low-band data to the delayed wideband data, by negating the coefficients of FIR filter g 440, or by delaying the low-band data by a non-causal amount either explicitly or via a non-causal filter. Other methods of removing the spectral content of the low-band data from the wideband data may also be used without departing from the spirit of the present invention.

Figure 5:
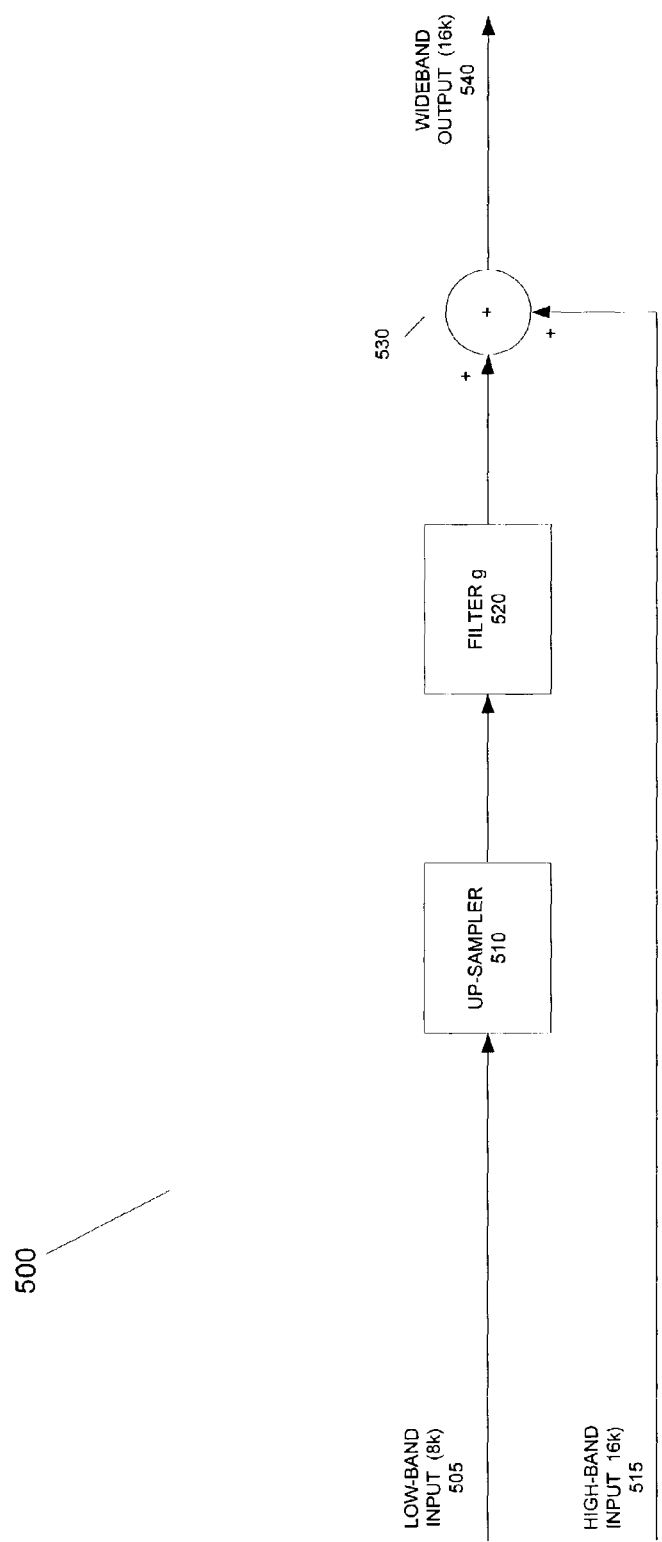
FIG. 5 is a block diagram of a band combiner in accordance with an illustrative embodiment of the present invention.

FIG. 5 is a block diagram of a band combiner 500 such as band combiners 250 and 272 of FIG. 2, according to an illustrative embodiment of the present invention. Band combiner 500 comprises up-sampler 510, FIR filter g 520, and adder 530. Low-band data 505 is up-sampled by a factor of two by up-sampler 510 and the up-sampler output is filtered by FIR filter g 520. The output of filter g 520 is added to the high-band data 515 at adder 530 to produce the wideband data 540. The combiner is essentially defined by the band splitter definition; i.e., the up-sampled low-band data is filtered through filter g 520 and added to the high-band data 515.

Band splitter 400 and band combiner 500 are lossless independent of the filters h 410 and g 440, 520. The filters are designed such that the high-band data really is high band. If a requirement exists that the spectral mask of the low-band data meet the spectral mask of G.712, h is non-linear phase. This requirement may also impose some limitations on the attenuation at about 4 kHz.

The filter h 410 is illustratively an FIR filter (of length N) having a frequency response that is maximally flat in the pass-band. Such a frequency response may be achieved, for example, via the Parks/McClellan/Remez exchange algorithm. The filter illustratively meets G.712 frequency response specifications. All roots are reflected inside the unit circle to obtain a minimum phase filter. The frequency response of filter h 410 may be defined as $H_o(z)$.

The filter g 440, 520 is then defined by a frequency response $G_o(z)=z^{-(N-1)}H_o(z^{-1})$. Thus, all coefficients in $H_o$ are reversed. In other words, $G_o(z)$ is maximum phase. Since $G_o$ is $H_o$ time-reversed, the low-band data 470 is linear phase with delay N. Note that $H_o(z)$ is not linear phase, but is maximum phase. Thus, if the input data 405 were filtered through $H_o(z)$, then down-sampled, up-sampled, and passed through $H_o(z)$ again, it would not be linear phase (although it would be minimum phase). If a signal is filtered through a filter h=h(0) . . . h(N−1) (which is non-symmetric) and then filtered through h reversed (i.e., hr=h(N−1 . . . h(0)) then the overall end-to-end result is linear phase.

In an alternative embodiment of the present invention, $G_o(z)$ is equal to $H_o(z)$ and $H_f(z)=z^{-L}-H_o(z)H_o(z)$. In this embodiment, $H_o(z)$ is high-pass. This achieves near-perfect reconstruction.

In another alternative embodiment, $G_o(z)$ is equal to $H_o(z)$ and $H_f(z)=A(z)-H_o(z)H_o(z)$, where $A(z)$ is an all-pass function. This gives near-perfect magnitude reconstruction but with some phase "error."

In yet a further embodiment wherein $H_o(z)$ is used for the reconstruction filter, $H_o(z)$ has the same magnitude response as $G_o(z)$. In this case we can write $G_o(z)=H_o(z) A_o(z)$, where $A_o(z)$ is an all-pass function given by $A(z)=G_o(z)/H_o(z)$. The high-pass branch is filtered via $1/A_o(z)$ (which is still an all-pass). In one such embodiment, the reconstruction filter is forced to be linear phase. If this is accomplished, the filter bank is not perfect reconstruction, but it is minimum phase (with no magnitude distortion). There is a MIPs penalty in running the all-pass, and there is no guarantee it will be well-behaved (although it should be). The result is that this gives a tradeoff between delay (minimum phase) and linearity of phase.

As describe previously, in the exemplary embodiment of FIG. 4 the reconstructed low-band data is removed from the wideband data 405 delayed by N using subtraction, to give the high-band data 480. By definition, this is perfect reconstruction. Since the overall transfer characteristic of the low-band filter is linear phase, the transfer function to obtain the high-band data is "high-pass", assuming the low-band filter is maximally flat in the pass-band.

The band combiner 500 re-samples the low-band data 505 with the up-sampler 510 and filter g 520, and then adds in the high-band data 515, producing wideband data 540.

If the low-band data (8 kHz sampling) is used in, for example, the switchboard 210 of FIG. 2 to conference with a narrowband coder, then G.712 is met. If the wideband data is used, it is perfect reconstruction. The wideband data has a delay of N and is linear phase/perfect reconstruction. In illustrative embodiments, a delay N of 32 or 40 is used, which would be a 2 or 2.5 milliseconds (ingress) delay at 16 kHz sampling.

The above-described filter design achieves G.712 compliance, G.722 compliance, good separation (little overlap) of the low and high bands, and substantially perfect reconstruction of the signals.

Figure 6:
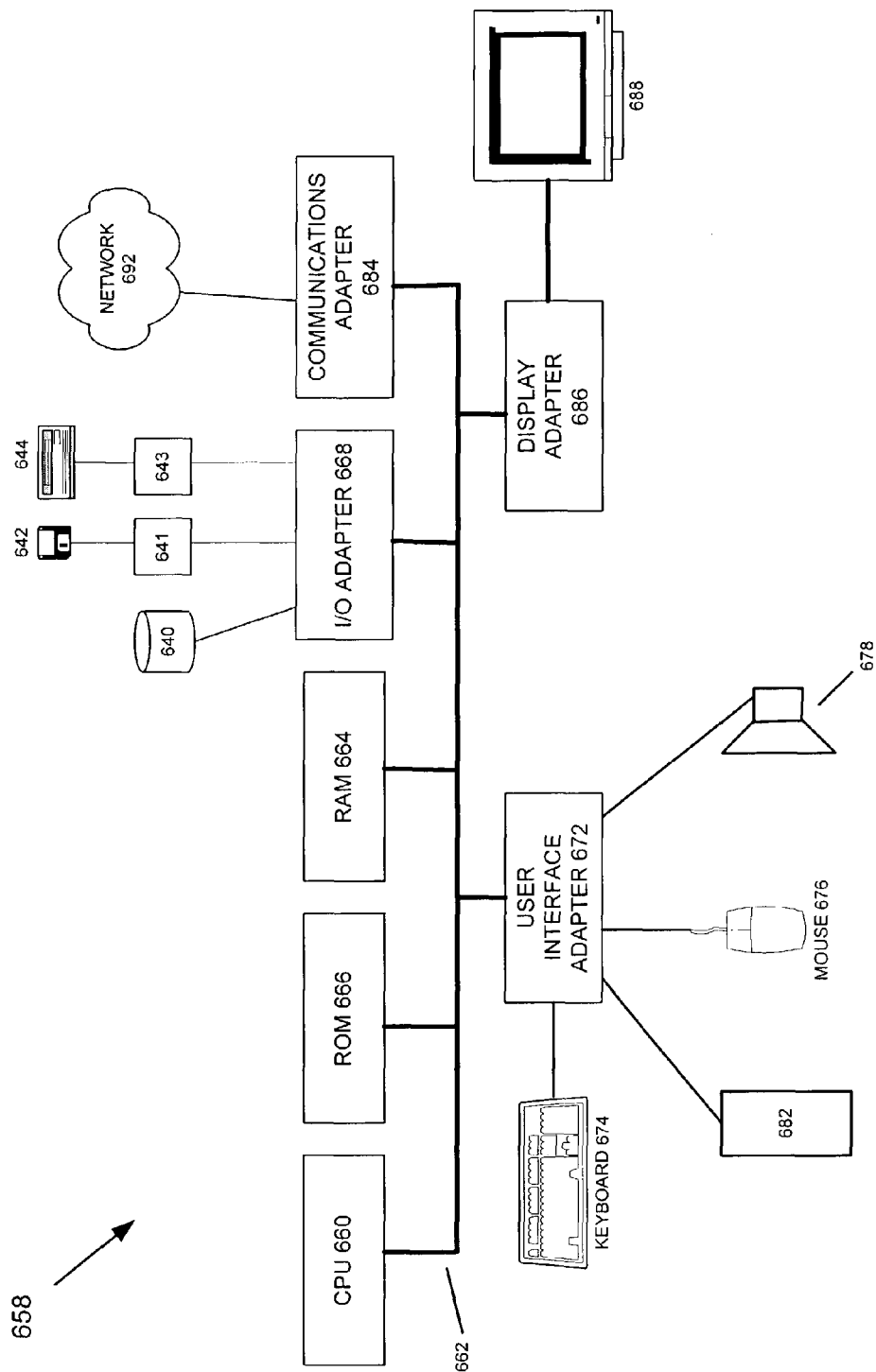
FIG. 6 is a block diagram of an exemplary terminal in which aspects of the present invention may be practiced.

Referring now to FIG. 6, there is illustrated a block diagram of an exemplary terminal 658, corresponding to terminal 110 as depicted in FIG. 1, in which an embodiment according to the present invention may be practiced. A processor 660 is interconnected via system bus 662 to random access memory (RAM) 664, read only memory (ROM) 666, an input/output adapter 668, a user interface adapter 672, a communications adapter 684, and a display adapter 686. The input/output adapter 668 connects peripheral devices such as hard disc drive 640, floppy disc drives 641 for reading removable floppy discs 642, and optical disc drives 643 for reading removable optical disc 644. The user interface adapter 672 connects devices such as a keyboard 674, a speaker 678, and microphone 682 to the bus 662. The microphone 682 generates audio signals which are digitized by the user interface adapter 672. The speaker 678 receives audio signals which are converted from digital samples to analog signals by the user interface adapter 672. The display adapter 686 connects a display 688 to the bus 662. It will be clear to one skilled in the art that embodiments of the present invention may also be practiced in other types of terminals as well, including but not limited to, a telephone without a hard disk drive 640, a floppy disk drive 641, nor optical disk drive 643, in which the program instructions may be stored in ROM 666, or downloaded over communications adapter 684 and stored in RAM 664. An embodiment may also be practiced in, for example, a portable hand-held terminal with little or no display capability, in a consumer home entertainment system, or even in a multi-media game system console.

An embodiment of the present invention can be implemented as sets of instructions resident in the RAM 664 or ROM 666 of one or more terminals 658 configured generally as described in FIG. 6. Until required by the terminal 658, the set of instructions may be stored in another memory readable by the processor 660, such as hard disc drive 640, floppy disc 642, or optical disc 644. One skilled in the art would appreciate that the physical storage of the sets of instructions physically changes the medium upon which it is stored electrically, magnetically, or chemically so that the medium carries information readable by a processor.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Notwithstanding, the invention and its inventive arrangements disclosed herein may be embodied in other forms without departing from the spirit or essential attributes thereof. Accordingly, reference should be made to the following claims, rather than to the foregoing specification, as indicating the scope of the invention. In this regard, the description above is intended by way of example only and is not intended to limit the present invention in any way, except as set forth in the following claims.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A split band signal processing system, comprising:
   a first filter for modifying wideband data to produce low-band data representing spectral components occupying a first band width with non-linear phase;
   a second filter for modifying the low-band data to produce reconstructed low-band data with a linear phase with respect to the wideband data;
   a delay element for delaying the wideband data; and
   a device for removing the low-band data from the delayed wideband data to produce high-band data representing spectral components occupying a second band width above the first band width, the high-band data produced by removing reconstructed low-band data with the linear phase from the wideband data.

2. The system of claim 1, wherein a spectral mask of the low-band data meets a spectral mask of G.712.

3. The system of claim 1, wherein the first filter further comprises a down-sampler for reducing a sampling rate of the low-band data.

4. The system of claim 3, further comprising:
an up-sampler for up-sampling the low-band data from the down-sampler where the second filter modifies the low-band data from the up-sampler to produce the reconstructed low band data.

5. The system of claim 4, wherein the first filter has a frequency response of $H_o(z)$ and the second filter has a frequency response of $z^{-(N-1)}H_o(z_{-1})$.

6. The system of claim 1, comprising:
a detector for specifically detecting presence in the wideband data of one or more certain frequencies, the detector processing only spectral components represented by the low-band data.

7. The system of claim 6, wherein the one or more certain frequencies comprise a dual tone multi-frequency (DTMF) tone pair.

8. The system of claim 1, comprising:
echo canceller circuitry that cancels echo present in the wideband data by modifying the low-band data and the high-band data.

9. The system of claim 1, wherein the filter is a finite impulse response (FIR) filter of length N.

10. The system of claim 9, wherein the reconstructed low-band data has a linear phase with delay N.

11. A split band signal processing system, comprising:
a first filter for filtering wideband data;
a down-sampler for down-sampling an output of the first filter to produce low-band data, wherein the low-band data represents spectral components that are less than a predefined frequency;
an up-sampler for up-sampling the low-band data;
a second filter for filtering the up-sampled low-band data to produce reconstructed low-band data with a linear phase, the second filter being different than the first filter;
a delay element to delay the wideband data; and
a device for removing the reconstructed low-band data from the delayed wideband data to produce high-band data representing spectral components that are greater than the predefined frequency.

12. The system of claim 11, wherein a spectral mask of the low-band data meets a spectral mask of G.12.

13. The system of claim 11, comprising:
a detector for specifically detecting presence in the wideband data of one or more certain frequencies, the detector processing only spectral components represented by the low-band data.

14. The system of claim 13, wherein the one or more certain frequencies comprise a dual tone multi-frequency (DTMF) tone pair.

15. The system of claim 11 comprising:
echo canceller circuitry that cancels echo present in the wideband data by modifying the low-band data and the high-band data.

16. A split band signal processing system, comprising:
a band splitter that processes wideband data to produce low-band data at a low-band sampling rate and high-band data at a wideband sampling rate, where the low-band data represents spectral components that are less than a predefined frequency and the high-band data represents spectral components that are greater than the predefined frequency, the band splitter comprising:
a first filter for filtering the wideband data to produce low-band data with non-linear phase; and
a second filter for filtering the low-band data with non-linear phase to produce low-band data with linear phase;
processing circuitry that processes the low-band data to produce processed low-band data at the low-band sampling rate; and
a band combiner that combines the processed low-band data with the high-band data to produce processed wideband data at the wideband sampling rate for transmission over a packet network.

17. The system of claim 16, wherein a spectral mask of the low-band data meets a spectral mask of G.712.

18. The system of claim 16, comprising:
a detector for specifically detecting presence in the wideband data of one or more certain frequencies, the detector processing only spectral components represented by the low-band data.

19. The system of claim 18, wherein the one or more certain frequencies comprise a dual tone multi-frequency (DTMF) tone pair.

20. The system of claim 16, comprising:
echo canceller circuitry that cancels echo present in the wideband data by modifying the low-band data and the high-band data.

21. The system of claim 16, wherein the band splitter comprises:
the first filter for filtering the wideband data at a wideband sampling rate;
a down-sampler for down-sampling an output of the first filter to produce the low-band data with non-linear phase at a low-band sampling rate;
an up-sampler for up-sampling the low-band data with non-linear phase at the wideband sampling rate; and
the second filter for filtering the up-sampled low-band data with non-linear phase to produce the low-band data with linear phase at the wideband sampling rate for producing the high-band data at the wideband sampling rate.

22. The system of claim 21, wherein the band combiner comprises a third filter for filtering up-sampled low-band data with non-linear phase to produce low-band data with linear phase at the wideband sampling rate for reconstruction of the wideband data, wherein the third filter is the same as the second filter.

23. The system of claim 21, wherein the first and the second filters are finite impulse response (FIR) filters of length N, where an order of the first filter is reversed for the second filter.

24. A method of processing wideband data as low-band data and high-band data in a communication terminal, the method comprising:
filtering wideband data, in the communication terminal, to produce low-band data with non-linear phase representing spectral components that occupy a first band width;
delaying the wideband data, in the communication terminal; and
removing reconstructed low-band data with linear phase from the delayed wideband data, in the communication terminal, to produce high-band data representing spectral components that occupy a second band width above the first band width, where the reconstructed low-band data with linear phase is reconstructed from the low-band data with non-linear phase.

25. The method of claim 24, wherein a spectral mask of the low-band data meets a spectral mask of G.712.

26. The method of claim 24, comprising:
specifically detecting presence in the wideband data of one or more certain frequencies, the detecting processing only spectral components represented by the low-band data.

27. The method of claim 26, wherein the one or more certain frequencies comprise a dual tone multi-frequency (DTMF) tone pair.

28. The method of claim 26, comprising:
packetizing a second wideband data into packets; and
holding the packets responsive to the detecting.

29. The method of claim 24, comprising:
canceling echo present in the wideband data by modifying the low-band data and the high-band data.

30. A method of processing wideband data as low-band data and high-band data in a communication terminal, the method comprising:
filtering the wideband data, in the communication terminal, to produce filtered wideband data at a wideband sampling rate;
down-sampling the filtered wideband data, in the communication terminal, to produce low-band data with non-linear phase at a low-band sampling rate;
up-sampling the low-band data with non-linear phase, in the communication terminal, to produce up-sampled low-band data at the wideband sampling rate;
filtering the up-sampled low-band data with non-linear phase, in the communication terminal, to produce filtered up-sampled low-band data with linear phase at the wideband sampling rate;
delaying the wideband data, in the communication terminal; and
removing the filtered up-sampled low-band data with linear phase from the delayed wideband data, in the communication terminal, to produce high-band data at the wideband sampling rate.

31. The method of claim 30, wherein a spectral mask of the low-band data meets a spectral mask of G.712.

32. The method of claim 30, comprising:
specifically detecting presence in the wideband data of one or more certain frequencies, the detecting processing only spectral components represented by the low-band data.

33. The method of claim 32, wherein the one or more certain frequencies comprise a dual tone multi-frequency (DTMF) tone pair.

34. The method of claim 32, comprising:
packetizing a second wideband data into packets; and
holding the packets responsive to the detecting.

35. The method of claim 30, comprising:
canceling echo present in the wideband data by modifying the low-band data and the high-band data.

36. A method of processing wideband data as low-band data and high-band data in a communication terminal, the method comprising:
splitting spectral content of the wideband data, in the communication terminal, producing low-band data representing spectral components that are less than a predefined frequency and high-band data representing spectral components that are greater than the predefined frequency;
processing, in the communication terminal, the low-band data to produce processed low-band data; and
combining, in the communication terminal, the processed low-band data with the high-band data to produce processed wideband data.

37. The method of claim 36, wherein a spectral mask of the low-band data meets a spectral mask of G.712.

38. The method of claim 36, comprising:
specifically detecting presence in the wideband data of one or more certain frequencies, the detecting processing only spectral components represented by the low-band data.

39. The method of claim 38, wherein the one or more certain frequencies comprise a dual tone multi-frequency (DTMF) tone pair.

40. The method of claim 38, comprising:
packetizing a second wideband data into packets; and
holding the packets responsive to the detecting.

41. The method of claim 36, comprising:
canceling echo present in the wideband data by modifying the low-band data and the high-band data.

42. A non-transient computer-readable medium, having stored thereon a computer program having a plurality of code sections for processing wideband data, the code sections executable by a processor for causing the processor to perform operations, comprising:
filtering wideband data having a first sampling rate;
down-sampling the filtered wideband data to produce low-band data with non-linear phase having a second sampling rate, the low-band data representing spectral components that are less than a predefined frequency;
up-sampling the low-band data with non-linear phase to produce low-band data with non-linear phase having the first sampling rate;
filtering the up-sampled low-band data with non-linear phase to produce filtered up-sampled low-band data with linear phase;
delaying the wideband data;
removing the filtered up-sampled low-band data with linear phase from the delayed wideband data to produce high-band data representing spectral components that are greater than the predefined frequency.

43. The computer-readable medium of claim 42, wherein a spectral mask of the low-band data meets a spectral mask of G.712.

44. The computer-readable medium of claim 42, wherein the code sections are executable by the processor to cause the processor to perform operations comprising:
specifically detecting presence in the wideband data of one or more certain frequencies, the detecting processing only spectral components represented by the low-band data.

45. The computer-readable medium of claim 44, wherein the one or more certain frequencies comprise a dual tone multi-frequency (DTMF) tone pair.

46. The computer-readable medium of claim 44, wherein the code sections are executable by the processor to cause the processor to perform operations comprising:
packetizing a second wideband data into packets; and
holding the packets responsive to the detecting.

47. The computer-readable medium of claim 42, wherein the operations comprise:
canceling echo present in the wideband data by modifying the low-band data and the high-band data.

48. A non-transient computer-readable medium, having stored thereon a computer program having a plurality of code sections for processing wideband data, the code sections executable by a processor for causing the processor to perform operations, comprising:

splitting spectral content of wideband data at a wideband sampling rate to produce low-band data with non-linear phase at a low-band sampling rate, where the low-band data represents spectral components that are less than a predefined frequency;

reconstructing the low-band data with linear phase at the wideband sampling rate from the low-band data with non-linear phase; and producing high-band data by removing the reconstructed low-band data with linear phase from the wideband data, where the high-band data represents spectral components that are greater than the predefined frequency.

49. The computer-readable medium of claim 48, wherein a spectral mask of the low-band data meets a spectral mask of G.712.

50. The computer-readable medium of claim 48, wherein the code sections are executable by the processor to cause the processor to perform operations comprising:

specifically detecting presence in the wideband data of one or more certain frequencies, the detecting processing only spectral components represented by the low-band data.

51. The computer-readable medium of claim 50, wherein the one or more certain frequencies comprise a dual tone multi-frequency (DTMF) tone pair.

52. The computer-readable medium of claim 50, wherein the code sections are executable by the processor to cause the processor to perform operations comprising:

packetizing a second wideband data into packets; and
holding the packets responsive to the detecting.

53. The computer-readable medium of claim 48, wherein the operations comprise:

canceling echo present in the wideband data by modifying the low-band data and the high-band data.

* * * * *

UNITED STATES PATENT AND TRADEMARK OFFICE
CERTIFICATE OF CORRECTION

PATENT NO. : 8,879,432 B2
APPLICATION NO. : 10/313697
DATED : November 4, 2014
INVENTOR(S) : Wilf LeBlanc et al.

Page 1 of 1

It is certified that error appears in the above-identified patent and that said Letters Patent is hereby corrected as shown below:

In the claims

Column 15, line 30, after "the" insert --first--.

Column 15, line 51, change "G.12" to --G.712--.

Signed and Sealed this
Ninth Day of August, 2016

Michelle K. Lee
*Director of the United States Patent and Trademark Office*